US012711207B1

(12) United States Patent
Meike et al.

(10) Patent No.: US 12,711,207 B1
(45) Date of Patent: Aug. 18, 2026

(54) AGENT-TO-AGENT COMMUNICATION SECURITY PROTOCOL FOR ARTIFICIAL INTELLIGENCE AGENTS WITH TRANSLATION LAYER ENFORCEMENT

(71) Applicant: INTUIT INC., Mountain View, CA (US)

(72) Inventors: Roger C. Meike, Emerald Hills, CA (US); Prashant Asthana, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/537,783

(22) Filed: Feb. 12, 2026

(51) Int. Cl.

| | |
|---|---|
| ***G06F 21/16*** | (2013.01) |
| ***G06F 9/50*** | (2006.01) |
| ***G06F 21/60*** | (2013.01) |
| ***G06F 21/62*** | (2013.01) |
| ***G06F 40/284*** | (2020.01) |
| *H04L 9/32* | (2006.01) |

(52) U.S. Cl.
CPC ............ *G06F 21/16* (2013.01); *G06F 9/5027* (2013.01); *G06F 21/602* (2013.01); *G06F 21/6218* (2013.01); *G06F 40/284* (2020.01); *H04L 9/32* (2013.01)

(58) Field of Classification Search
CPC .... G06F 21/16; G06F 21/6218; G06F 9/5027; H04L 9/32
See application file for complete search history.

(56) References Cited

U.S. PATENT DOCUMENTS 12,592,823 B1 * 3/2026 Manton .................... H04L 9/32
12,596,831 B1 * 4/2026 Peleg ................. G06F 21/6218
2025/0258708 A1 * 8/2025 Crabtree .............. G06F 9/5027

* cited by examiner

*Primary Examiner* — Barbara B Anyan
(74) *Attorney, Agent, or Firm* — Patterson + Sheridan, LLP

(57) ABSTRACT

Aspects of the present disclosure relate to protocols and systems for facilitating agent-to-agent communications in an agentic artificial intelligence (AI) system. Embodiments include establishing a schema for a first AI agent and a second AI agent based on a communication process between the first AI agent and the second AI agent. Embodiments further include configuring a translation component to interface between the first AI agent and the second AI agent based on the schema. Embodiments further include using the configured translation component to generate a secure version of a prompt generated by the first AI agent. Embodiments further include providing the secure version of the prompt as input to the second AI agent. In some embodiments, cryptographic techniques such as watermarking and establishing encrypted communication channels are used to provide additional security for agent-to-agent interactions.

20 Claims, 10 Drawing Sheets

AGENT-TO-AGENT COMMUNICATION SECURITY PROTOCOL FOR ARTIFICIAL INTELLIGENCE AGENTS WITH TRANSLATION LAYER ENFORCEMENT

INTRODUCTION

Aspects of the present disclosure relate to techniques and systems for securing communication between artificial intelligence agents.

BACKGROUND

Agentic artificial intelligence (AI) systems are used by millions of people, businesses, and organizations around the world to automate tasks. These agentic systems may use machine learning models and tools (e.g., information retrieval tools) to perform various tasks automatically or with minimal manual intervention. For example, an AI agent may be used to help a user book a flight, create an invoice, learn about a topic, complete a form, navigate a website, and/or the like.

Agentic AI systems that involve agent-to-agent interactions are becoming increasingly common. Agent-to-agent interactions have the potential to greatly increase the effectiveness of agentic AI systems by allowing for a flexible combination of agentic "skills" that are suited for a given task. For instance, a first agent may be specialized for a first task and a second agent may be specialized for a second task. Allowing these two agents to interact and work together toward a single objective may allow for completing the objective more effectively than any single agent.

However, there are numerous technical challenges associated with agent-to-agent communications in agentic AI systems. For instance, due to technical limitations of existing agentic AI technology, AI agents that communicate with each other without human supervision may hallucinate or otherwise perform actions that are undesired. Also, the open-ended nature of outputs generated by certain AI agents can result in significant complications. As an example, two AI agents may engage in several rounds of open-ended natural language "dialog" to perform a task. Several rounds of response generation per task may lead to an exorbitant amount of resource consumption and latency. Also, due to the open-ended nature of the prompts that each agent provides to the other, the end result of the interaction may be low-quality (e.g., the final output may be inaccurate, off-topic, incomplete, and/or the like). Furthermore, agent-to agent interaction can create security risks for agentic AI systems. For example, using open-ended natural language prompts, a rogue AI agent may attempt to make a second agent perform a task that violates guidelines put in place for the second agent.

Accordingly, there is a need in the art for improved agentic AI systems.

BRIEF SUMMARY

Certain embodiments provide a method. The method generally includes: establishing a schema for a first artificial intelligence (AI) agent and a second AI agent based on a communication process between the first AI agent and the second AI agent; configuring a translation component to interface between the first AI agent and the second AI agent based on the schema; generating a natural language prompt via the first AI agent; generating an intermediate representation of the natural language prompt via the translation component; generating a secure version of the natural language prompt via the translation component based on the intermediate representation; and providing the secure version of the natural language prompt as input to the second AI agent.

Some embodiments provide a method. The method generally includes: establishing a schema for a first artificial intelligence (AI) agent and a second AI agent based on a communication process between the first AI agent and the second AI agent; configuring a translation component to interface between the first AI agent and the second AI agent based on the schema; using the configured translation component to generate a secure version of a prompt generated by the first AI agent; and providing the secure version of the prompt as input to the second AI agent.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
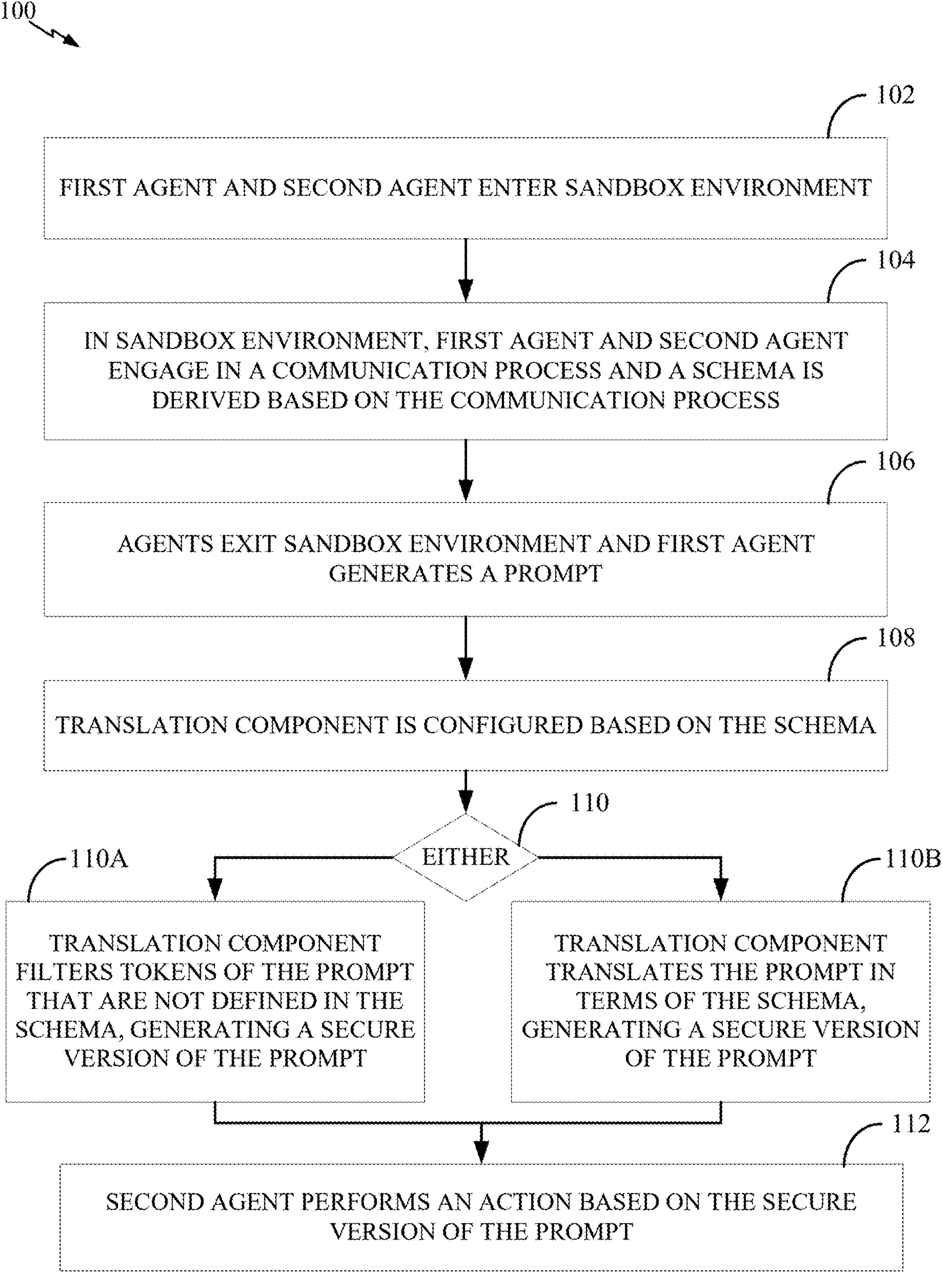
FIG. 1 depicts an example of operations related to agent-to-agent communication.

Aspects of the present disclosure provide apparatuses, methods, processing systems, and computer-readable mediums for securing agent-to-agent communications in agentic artificial intelligence (AI) systems.

According to certain embodiments, a communication process between two AI agents may be initiated by placing the agents in a sandbox environment. The sandbox environment is generally an environment where the agents are unable to interact with outside tools, data sources, and/or the like that the agents would normally be able to access. For example, an agent normally may have access to a database and be able to retrieve information from the database and edit data within the database. In the sandbox environment, the agent may be unable to retrieve data from the database and/or unable to edit data within the database. Conducting the communication process in the sandbox environment prevents the agents from making unwanted changes to outside data or performing other unwanted actions during the relatively open-ended schema negotiation stage.

At the schema negotiation stage, the AI agents may communicate in order to derive a schema to be used after exiting the sandbox environment. For example, a first agent may have a goal that is related to assisting a user. The negotiation stage may involve the first agent asking the second agent (e.g., by generating a prompt that is provided to the second agent) whether the second agent can help with a step related to the goal. The second agent may generate a response indicating whether the second agent can help. The response may also include information about functionalities of the second agent that are related to the goal, permissions of the first agent, and/or the like. Based on the communication conducted at the negotiation stage, the schema is derived. For example, the communication may reveal that the second agent can perform a given task. Based on this, a token that represents the given task may be added to the schema. The schema may also set forth restraints for the agents that are revealed in the negotiation stage, such as allowed ranges for values, permitted actions and sources, and/or the like.

After the negotiation stage concludes and the agents exit the sandbox environment, the schema may be used in communications between the two agents. For example, if the first agent makes a determination to prompt the second agent to perform a task, a token that represents the task may be used to invoke the second agent to perform the task. Accordingly, tokens that are assigned to actions, objects, variables, and/or the like may be used to direct the agents instead of open-ended natural language prompts generated by the agents. Thus, the outputs and actions of the agents relative to one another may be confined to tokens of the schema that are fixed after the negotiation stage.

Embodiments of the present disclosure provide numerous technical and practical effects and benefits. For instance, because agent-to-agent interactions are confined by the negotiated tokens, the agent-to-agent communication process may be significantly streamlined. As an example, a first agent may be used to induce a second agent to perform a task. Using existing agentic technologies, the agents may engage in several rounds of open-ended natural language communication in order to complete the task. However, by constricting agent-to-agent communications to negotiated tokens, embodiments of the present disclosure allow for limiting the communication between the agents to a single prompt and response. This significantly reduces the amount of latency and resource utilization required in agent-to-agent communications.

Furthermore, by constricting agent-to-agent communications based on the schema, embodiments disclosed herein prevent agents from performing undesired actions. For example, open-ended natural language prompts generated by a first agent may induce a second agent to perform actions that violate guardrails or other guidelines set for the agent. As another example, a rogue agent may attempt to jailbreak another agent using open-ended natural language prompts. Constricting agent-to-agent communications to pre-negotiated tokens that represent allowed actions can eliminate the possibility of jailbreaking an agent or otherwise causing the agent to violate guardrails, thereby improving computing security.

Example Operations Related to Agent-to-Agent Communication

FIG. 1 depicts example operations 100 related to agent-to-agent communication. For example, operations 100 may be performed by one or more of the components described below with respect to FIG. 2, FIG. 3, and FIG. 5.

Operations 100 begin at step 102 with a first artificial intelligence (AI) agent and a second AI agent entering a sandbox environment. The sandbox environment may generally be an environment where the agents are not able to access endpoints or perform actions that they would normally be able to perform. For example, a given agent may normally be able to access a database or perform an application programming interface (API) call. In the sandbox environment, the given agent may be unable to read or write data from the database or call the API. In some embodiments, the sandbox environment comprises a Docker image or a container that is configured to prevent an agent from accessing an endpoint or performing an action. Based on such a Docker image or container, an agent may be able to "understand" its capabilities even though the agent in unable to perform the various capabilities.

Operations 100 continue at step 104 with the first agent and the second agent engaging in a communication process that is used to derive a schema. The communication process may involve the agents "communicating" with each other by generating prompts. For example, the first agent may generate a prompt that is provided to the second agent. The communication process may be used to outline capabilities of the agents and restraints for the agents. As an example, the first agent may have a goal of completing a task for a user. To complete the task the first agent may require the second agent to perform multiple subtasks. In this example, the first agent may ask the second agent if the second agent is capable of performing the subtasks. The second agent may generate a response indicating that the second agent is capable of performing one of the subtasks. The response may also indicate restraints relating to performing the subtask.

In a specific example, the goal of the first agent may be to complete a form for a user. To complete this task, the first agent may ask the second agent if the second agent is capable of retrieving a certain type of information that is used to complete the form. In this example, retrieving the information would be a subtask. The second agent may generate a response indicating that the second agent is capable of retrieving the information. The response may also indicate an item that is required to retrieve the information. For example, if the information to be retrieved is information related to a user account, the required item may be a user identifier. In this example, the user identifier requirement is a restraint.

A schema may then be generated based on the capabilities and restraints. The schema may comprise tokens that represent actions, items, parameters, variables, restraints, and/ or the like. Continuing the above example, a first token (e.g., "T1") may be used to represent the information retrieval task and a second token (e.g., "T2") may be used to represent the user identifier restriction. As described in further detail below, the schema may be used to constrain interactions between the first agent and the second agent outside the sandbox. For example, a prompt asking the second agent to retrieve user profile data for a user associated with identifier 12345 may be represented in terms of the schema as {T1: true, param{T2: 12345}}. The schema may be generated by either of the agents or by a separate machine learning model or other natural language processing (NLP) technique.

Operations 100 continue at step 106 with the agents exiting the sandbox environment and the first agent generating a prompt. Once outside of the sandbox environment, the agents may be capable of performing their usual functionalities (e.g., accessing and modifying data within a database, making API calls, and/or the like). However, as discussed in further detail below, agent-to-agent communications between the two agents will be constrained by the negotiated schema. Thus, the prompt generated by the first agent may be provided to the translation component, which is configured as discussed in further detail below.

Operations 100 continue at step 108 with configuring a translation component based on the schema. The translation component may be a computing construct that is capable of using the negotiated schema to modify prompts. The translation component may comprise computing code that can be configured to enforce the schema. For example, once the schema is provided to the translation component, the translation component may parse prompts for words and/or phrases that correspond to items, actions, and/or the like that are represented by the schema. As described in further detail below, natural language text may be replaced with tokens defined in the schema and/or tokens that are not defined in the schema may be removed.

Operations 100 continue at step 110 with generating a secure version of the prompt generated by the first agent based on either using the translation component to filter tokens that are not defined in the schema from the prompt at 110A or translating the prompt in terms of the schema at 110B.

At 110A, the agents may be configured (e.g., trained, prompted, and/or otherwise configured) to generate prompts and responses in terms of the schema. Then, the translation component may remove tokens that do not comply with the schema. For example, if a prompt contains natural language text instead of the negotiated tokens, the natural language text may be removed from the prompt, the prompt may be blocked, and/or the like. The translation component may parse the prompt for the natural language text in order to remove the natural language text. A prompt that is verified as not containing natural language text (or not otherwise violating the schema) may be referred to as a secure version of a prompt. The secure version may be provided to the second agent.

Thus, at 110A, each of the agents may be configured to generate prompts and outputs in terms of the schema, and the translation component is used to remove natural language tokens. In other words, at 110A, the agents are configured to communicate using the schema/language that was negotiated in the sandbox environment instead of natural language. Accordingly, only prompts/responses that are represented in terms of the schema will be passed between the agents, thus eliminating the possibility of security risks such as prompt injection attacks and preventing the prompts/responses from being intercepted between the agents. Also, because the communications between the agents are confined to the schema, the inputs to and outputs from the agents are more structured and predictable, preventing hallucinations and improving system performance.

By contrast, at 110B, the agents may generate natural language prompts and responses. Then, the translation component may parse the prompts/responses for text that corresponds to the tokens defined in the schema. In certain embodiments, the translation component comprises a machine learning model that is configured to map natural language text to tokens in the schema. According to some embodiments, the translation component uses text matching techniques such as n-grams to map text to the tokens (n-grams are generally groups of up to n consecutive words or characters, where n is a positive integer). The natural language text may then be replaced with a token to which the text is mapped to create an intermediate version of the prompt. In a specific example, the token "T4" may correspond to performing a particular task. The prompt generated by the first agent may contain natural language instructions to perform the particular task. The translation component may parse the prompt and identify the text that corresponds to token "T4". Then, an intermediate representation of the prompt may be generated in terms of the token "T4". For example, the original prompt may comprise the text "perform the particular task", and the intermediate representation of the prompt may instead comprise the token "T4".

Thus, at 110B, the agents are configured to communicate in natural language, and the translation component is used to convert the natural language text from one agent into an intermediate representation in terms of the schema. Then, the translation component converts the intermediate representation back into natural language to be processed by the other agent. As discussed above, because the communications between the agents are confined to the schema, the inputs to and outputs from the agents are more structured and predictable, preventing hallucinations and improving system performance.

After an intermediate representation of the prompt is generated, the translation component may generate a secure version of the prompt by replacing the tokens with the natural language text represented by the tokens. The replacement natural language text may be a standardized version of the text represented by the token (as opposed to the original natural language text, which may be more open-ended). The secure version may be provided to the second agent.

Operations 100 continue at step 112 with the second agent performing an action based on the secure version of the prompt.

Example of Computing Components Related to Agent-to-Agent Communication

Figure 2:
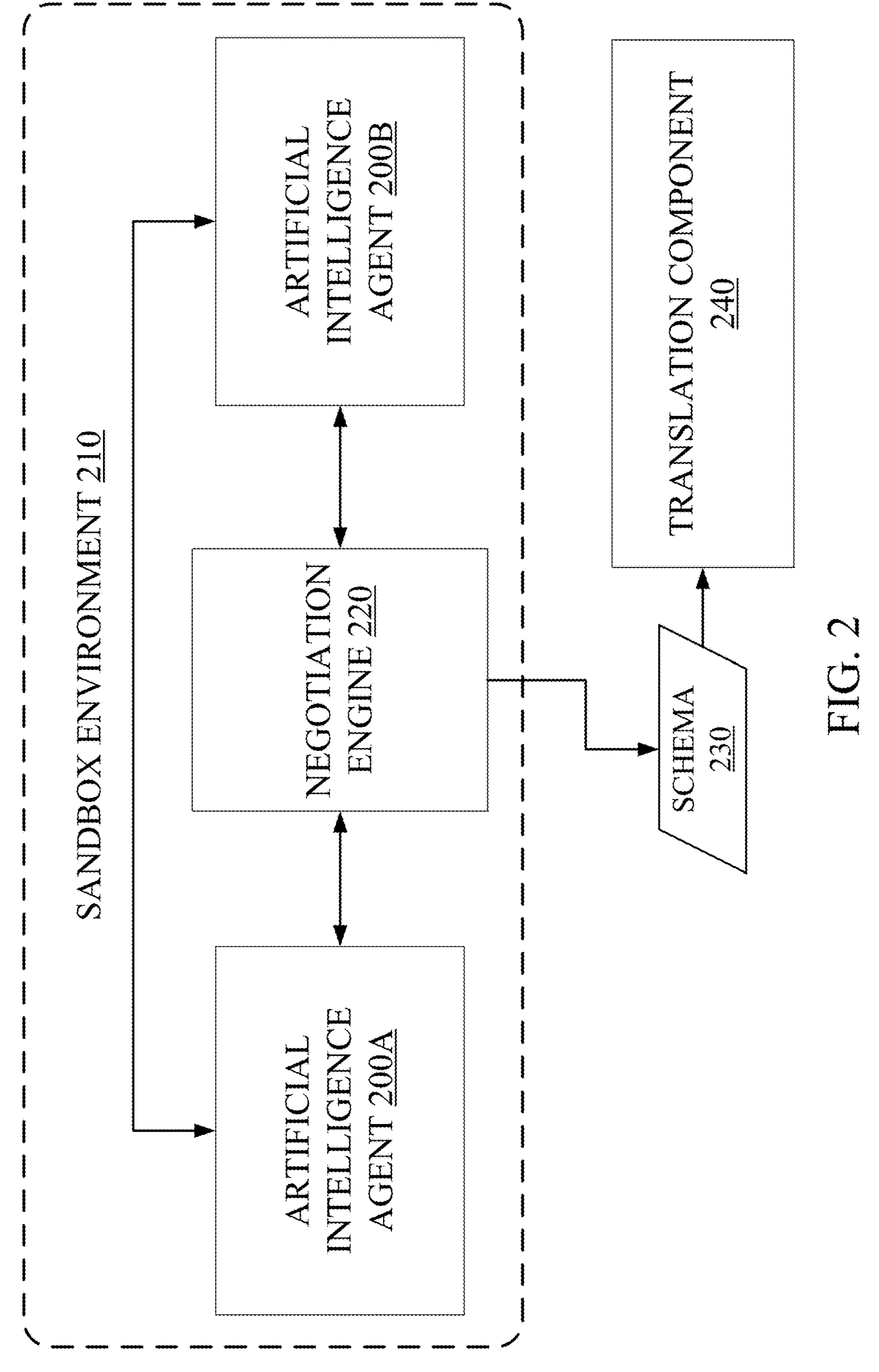
FIG. 2 depicts an example of computing components related to agent-to-agent communication.

FIG. 2 depicts an example of computing components related to agent-to-agent communication. The example embodiment depicted in FIG. 2 depicts functionality associated with negotiating tokens for a schema.

As depicted in FIG. 2, artificial intelligence agents 200A-B have entered a sandbox environment 210. The sandbox environment 210, which may be a Docker image, container, virtual machine, virtual computing environment (e.g., that abstracts physical computing resources of one or more physical computing devices), and/or the like, may be configured such that the artificial intelligence agents 200A-B are unable to access tools, data sources, endpoints, and or the like that are outside the sandbox environment 210. For example, artificial intelligence agent 200A may have been configured to call a given application programming interface (API). While in the sandbox environment 210, the artificial intelligence agent 200A may be unable to call the API as a result of restrictions imposed by the sandbox environment 210.

A Docker image generally refers to a lightweight, standalone, and executable package that contains everything needed to run a piece of software, including the code, runtime, libraries, environment variables, and configuration files. It may serve, for example, as a blueprint for creating one or more containers, ensuring that applications run consistently across different computing environments. A container generally refers to a lightweight, standalone computing environment that encapsulates an application and its dependencies. A container enables software to run consistently across one or more computing systems by abstracting underlying hardware and operating systems. Containers are often used for isolating workloads, enhancing security, and improving scalability in various development and deployment scenarios.

In some embodiments, before entering the sandbox environment 210, an encrypted communication channel may be established between the agents 200A-B. For example, the agents may perform a transport layer security (TLS) handshake in order to establish the channel.

Artificial intelligence (AI) agents are generally software systems that use machine learning models (e.g., language processing machine learning models such as large language models (LLMs)) to perform tasks either autonomously or with a relatively small amount of human oversight. Different AI agents may be configured to perform different tasks or operate in different domains. Artificial intelligence agent 200A may be a client agent that a user (or automated process) is using to perform a task such as completing a form. To complete the task, the agent 200A may need to find an agent that can perform an action, such as retrieving data or generating a value for a field. The agent 200A may enter the sandbox environment 210 with multiple candidate worker agents (e.g., agent 200A may enter the sandbox environment 210 either with one agent at a time or with multiple agents at the same time). The agent 200A may engage in a communication process with the candidate agents to see if the candidate agents can perform the desired action. If a candidate worker agent is unable to perform the action, a communication process may be initiated between the client agent 200A and another candidate worker agent.

As shown in FIG. 2, client agent 200A has entered the sandbox environment and engaged in a communication process with worker agent 200B. Agent 200B may be capable of performing the desired action. Accordingly, agent 200B may generate a response indicating that agent 200B is capable of performing the desired action. The response may also indicate restraints associated with performing the desired action. For example, the restraints may include input value restrictions, items required for performing the desired action, and/or the like.

The negotiation engine 220 may be used to negotiate a schema based on the results of the communication process between artificial intelligence agents 200A-B. For example, if the response generated by agent 200B indicates that agent 200B can perform the desired action, the desired action may be mapped to token "T1". If the response generated by agent 200B indicates that agent 200B requires a value for an input variable in order to perform the desired action, the input variable may be mapped to token "T2". The tokens may be associated with the text in the response to which the tokens are mapped. For example, if the response generated by agent 200B includes the text "yes, I can perform action X", the token "T1" may be associated with the text "perform action X". Associating the tokens with the text generated by the agent 200B may increase the likelihood of generating secure prompts that can be "understood" by agent 200B. In other embodiments, the tokens are mapped to standardized natural language text, such as text that is manually chosen to represent an action or item. Associating the tokens with standardized natural language text enables generating secure prompts that are standardized and consistent. As a result, hallucinations and latency spikes that may result from open-ended natural language prompts can be avoided.

The negotiation engine 220 may comprise a language processing machine learning model such as an LLM that identifies text associated with actions or items in a response and maps the identified text to tokens. In some embodiments, the negotiation engine comprises a tree-based classification model that identifies text associated with actions or items in a response and maps the identified text to tokens. Examples of tree-based models include (such as a random forest model, gradient-boosted tree model (such as XGBoost or LightGBM), and/or the like). The machine learning model may also be a neural network, another type of regression model, a support vector machine, or the like.

The negotiated tokens and indicated restraints may form a schema 230 which is provided to translation component 240. The schema is generally a mapping between the negotiated tokens and the associated text (e.g., standardized text or text included in a response generated by agent 200B), as well as the actions, parameters, and/or the like associated with the tokens. For example, the schema 230 may map token "T1" to performing action "X". The schema may also map "T1" to the standardized text "perform action X". Thus, as discussed in further detail below, if an intermediate prompt contains the token "T1", the translation component 240 may replace this token with the text "perform action X" to generate a secure prompt.

Figure 3:
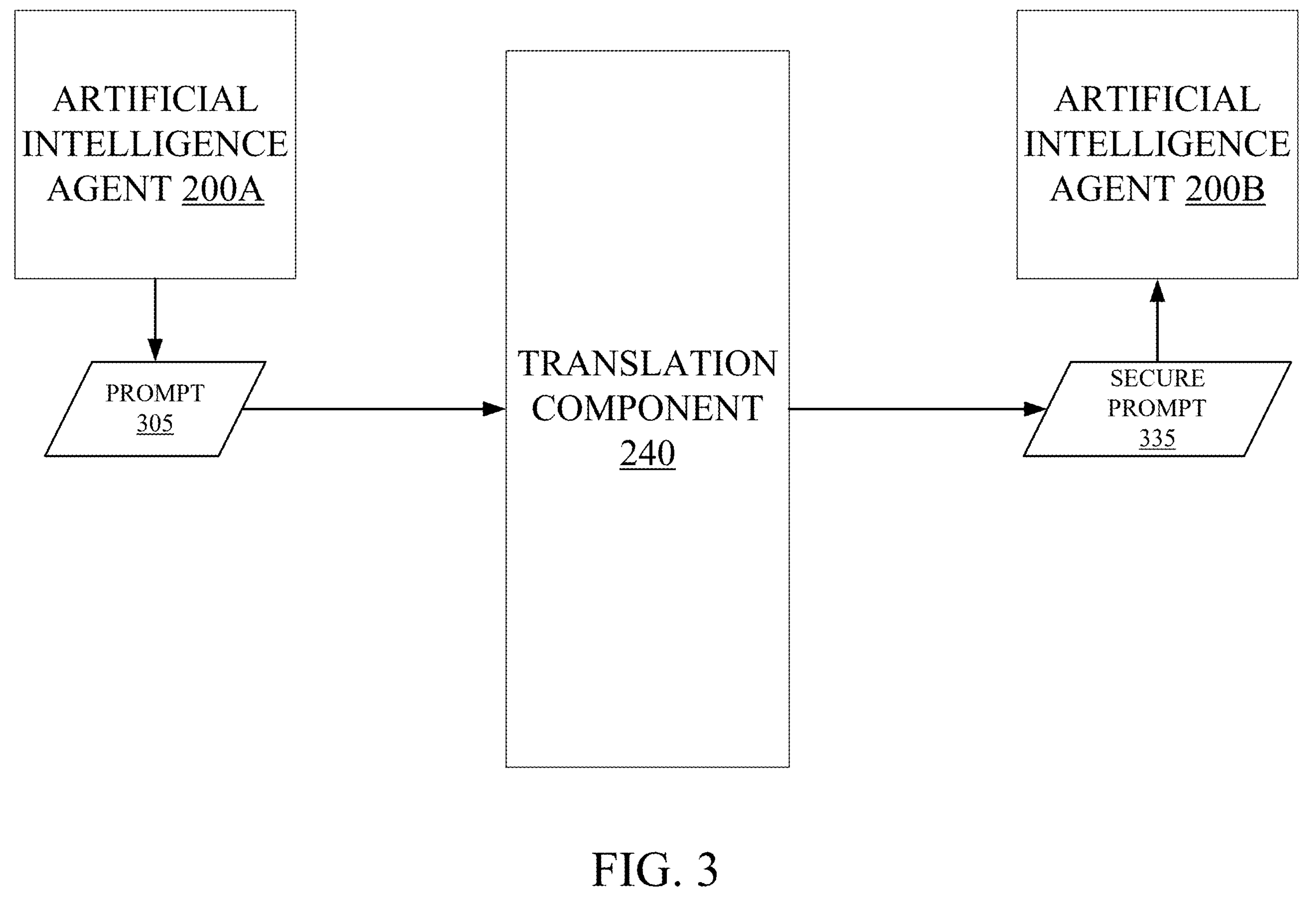
FIG. 3 depicts an additional example of computing components related to agent-to-agent communication.

FIG. 3 depicts an additional example of computing components related to agent-to-agent communication. In particular, FIG. 3 depicts functionality associated with controlling agent-to-agent communications outside of the sandbox environment once translation component 240 has been configured.

The translation component 240 may have been configured based on a schema that is negotiated as described above with respect to FIG. 2. As shown in the example depicted in FIG. 3, the translation component 240 is configured to filter and/or verify a prompt 305 in order to provide a secure prompt 335 to agent 200B.

The agents 200A-B may be configured to generate outputs in terms of the schema and understand inputs in terms of the schema. For example, the schema and/or instructions to adhere to the schema may be included in configuration prompts for the agents 200A-B. As another example, models used by the agent 200A-B may be trained to generate outputs that conform to the schema. Thus, the agents 200A-B may avoid natural language and instead generate prompts and responses in terms of the negotiated schema/language.

Agent 200A may first generate a prompt 305. The prompt may comprise instructions to perform a task, such as retrieving information or generating an item. The prompt 305 may be generated in terms of the negotiated schema. In a specific example, the prompt may comprise instructions to generate an invoice with a given identifier (e.g., "45678"). A first token (e.g., "T1") may represent the task of generating an invoice in the schema. A second token (e.g., "T2") may represent the identifier variable in the schema. Thus, the prompt 305 may comprise the text "T1: true; T2: 45678".

This prompt 305 may be provided to the translation component 240, which may parse the prompt 305 for any elements that violate the schema. For example, the prompt 305 may be blocked if the prompt contains elements that are not defined in the schema or if the prompt violates restrictions set forth in the schema (e.g., if a variable is outside an allowed range or in an improper format). Alternatively, text not defined in the schema may be filtered. For example, if the prompt 305 contains natural language text (e.g., if the prompt 305 comprises the text: "please create an invoice T1 with identifier T2: 45678"), the natural language text may be removed. If the prompt 305 violates the schema, the agent 200A may be provided with an indication that the schema has been violated, a model used by the agent 200A may be retrained, and/or the like. If the prompt 305 complies with the schema (e.g., based on the translation component 240 determining that the prompt 305 complies with the schema as generated or based on the translation component 240 filtering non-compliant text from the prompt 305), the prompt may be considered a secure prompt 335 and provided to agent 200B.

Based on the secure prompt 335, agent 200B may generate a response and/or otherwise perform a task. A response generated by the agent 200B may also comply with the schema. For example, if the secure prompt 335 asked the agent 200B to retrieve a value for a given variable, the response generated by the agent may comprise the text "T5: 7890", where "T5" is a token that represents the variable and "7890" is the retrieved value for the variable. The translation component 240 may be used to ensure that the response is secure (e.g., as described above with respect to securing the prompt 305) and the secure response may be provided to agent 200A. Agent 200A may convert the response into natural language and provide the natural language response to a user. The natural language response may comprise the text "the value of the variable is 7890".

Figure 4:
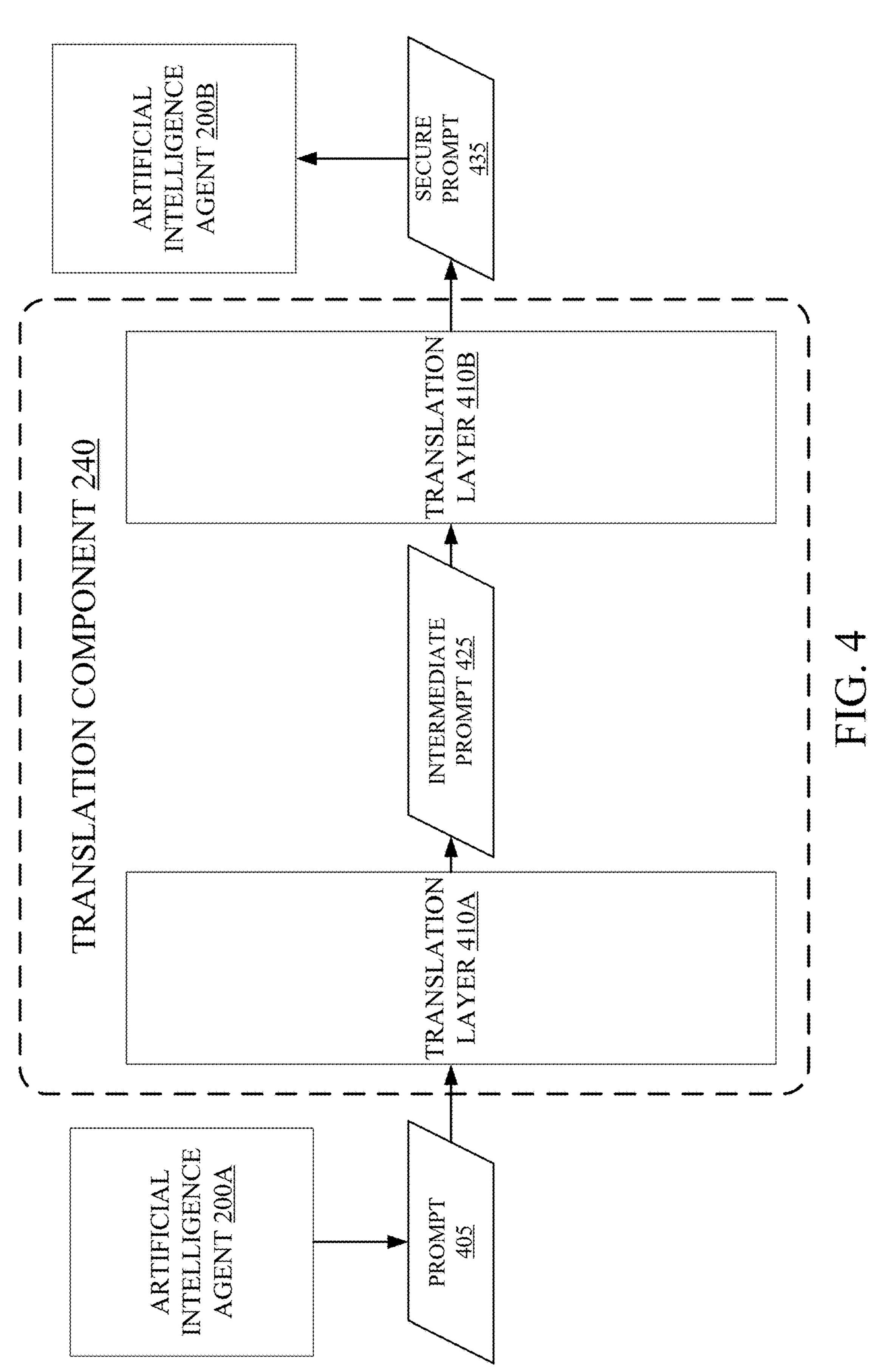
FIG. 4 depicts an additional example of computing components related to agent-to-agent communication.

FIG. 4 depicts an additional example of computing components related to agent-to-agent communication. In particular, FIG. 4 depicts functionality associated with an additional example of controlling agent-to-agent communications outside of the sandbox environment once translation component 240 has been configured.

As shown in FIG. 4, the prompt 405 is a natural language prompt generated by agent 200A. For example, the prompt 405 may comprise natural language instructions to perform a task such as generating an invoice.

The translation component 240 may be used to convert the natural language prompt 405 into a secure prompt 435. In this embodiment, a secure prompt 435 is a standardized natural language prompt that may cause the agent 200B to act in a consistent manner (as opposed to open-ended natural language prompts, that may lead to inconsistent results).

The translation component 240 may comprise two translation layers 410A-B. Translation layer 410A may convert the prompt 405 into an intermediate prompt 425. The intermediate prompt 425 may be a representation of the prompt in terms of the negotiated schema. The translation layer 410A may create the intermediate prompt 425 by mapping text of the prompt 405 to tokens defined in the schema. The mapping may be performed based on NLP techniques, machine learning techniques, text matching techniques, and/or any similar techniques as known in the art. For example, if the prompt contains text that matches text associated with a token, the token may be included in the intermediate prompt 425. For example, the prompt 405 may contain the text "please generate an invoice". Creating invoices may correspond to token "T1" in the negotiated schema. Thus, token "T1" may be included in the intermediate prompt 425.

In a particular example, natural language text in prompt is mapped to the schema based on creating an embedding representation of the prompt 405. Embeddings generally refer to vector representations of an entity that represent the entity as a vector in n-dimensional space such that similar entities are represented by vectors that are close to one another in the n-dimensional space. Embeddings may be generated using an embedding model in some embodiments, such as a bi-encoder or a cross-encoder. The embedding model may comprise a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Jena AI, Word2Vec, and GloVe embeddings. These are included as examples, and other techniques for generating embedding representations of entities are possible.

Embedding representations of the text within prompt 405 may be compared to embedding representations of text associated with tokens defined in the schema. For example, the comparison may be performed based on the distance between the representations in the embedding space. If the text representations are within a threshold distance of each other (or another condition is met), then the token associated with the text may be included in the intermediate response. For example, the prompt 405 may contain the text "please generate an invoice". Creating invoices may correspond to token "T1" in the negotiated schema. This token may be associated with an embedding representation of the text "generate an invoice". An embedding representation of the prompt 405 may be within a threshold distance of the embedding representation of "generate an invoice". Thus, token "T1" may be included in the intermediate prompt 425.

Translation layer 410B may convert the intermediate prompt 425 into secure prompt 435, a standardized natural language prompt. For example, the conversion may be based on replacing the schema tokens with their corresponding text. For example, if the token "T1" is associated with the text "generate an invoice", then the text "generate an invoice" may be used to replace the token "T1" in the intermediate prompt 425. Thus, the secure prompt 435 may contain the text "generate an invoice" instead of the token "T 1".

Agent 200B may generate a response (and/or perform another action) based on the secure prompt 435, and the response may be provided to translation component 240, which may convert the response into a secure response. For example, translation layer 410A may convert the natural language response into an intermediate representation and translation layer 410B may generate a standardized natural language response by replacing the schema tokens with the corresponding natural language text.

In some embodiments, the translation component 240 is sent to both agents and executed at the agents in order to translate intermediate prompts received by the agents into natural language prompts. Other embodiments provide that the translation component 240 is executed separately from the agents (e.g., on a trusted independent server). In some embodiments, watermarking and/or other cryptographic techniques are used to verify that prompts and/or responses are authentic. For example, watermarking may be used to ensure that a prompt has passed through translation component 240 before being provided to another agent. The watermark may be embedded in a prompt/response at the translation component 240 and the watermark may be verified before the prompt/response is provided to an agent.

Figure 5:
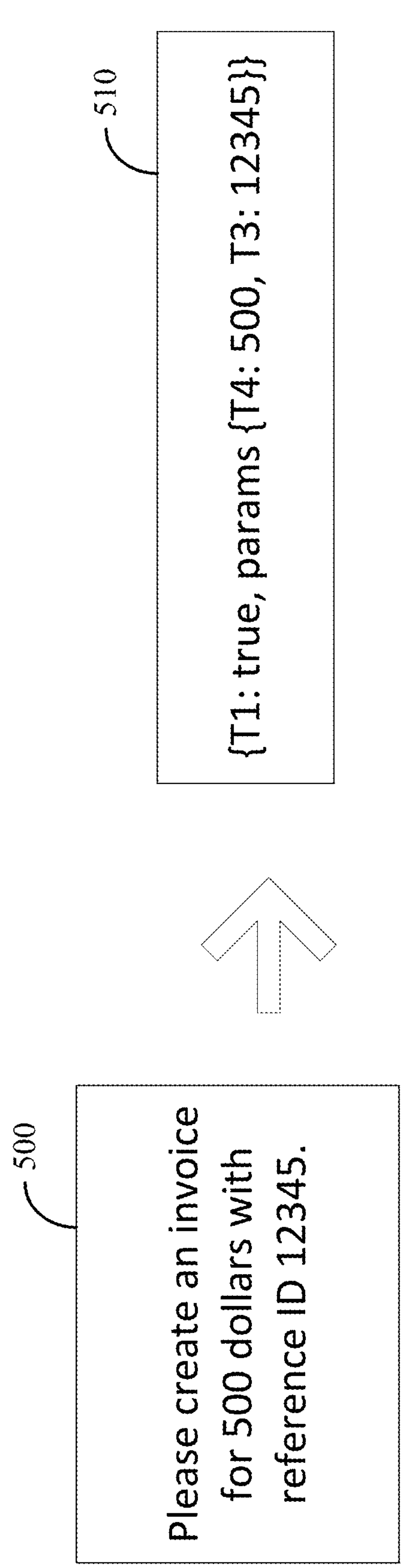
FIG. 5 depicts an example of natural language prompt and an intermediate representation of the natural language prompt.

Example of a Natural Language Prompt and an Intermediate Representation of the Natural Language Prompt FIG. 5 depicts an example of a natural language prompt 500 and an intermediate representation 510 of the natural language prompt 500.

The natural language prompt includes instructions to create an invoice for five hundred dollars with a reference ID of 12345. As shown in this example, the action of creating an invoice corresponds to token "T1". Thus, the intermediate representation 510 includes the token "T1" with the predicate "true".

As shown in this example, the action of generating the invoice also has two parameters, which may have been revealed in a communication process conducted in the sandbox environment. The parameters are reference ID and amount. As indicated in the natural language prompt, the dollar amount for the invoice is five hundred and the reference ID is 12345. The token that corresponds to the dollar amount parameter is "T4" and the token that corresponds to the reference ID parameter is "T3". Thus, the intermediate representation contains the text "T4: 500, T3: 12345".

Example of Computing Components Related to Agent-to-Agent Communication

Figure 6:
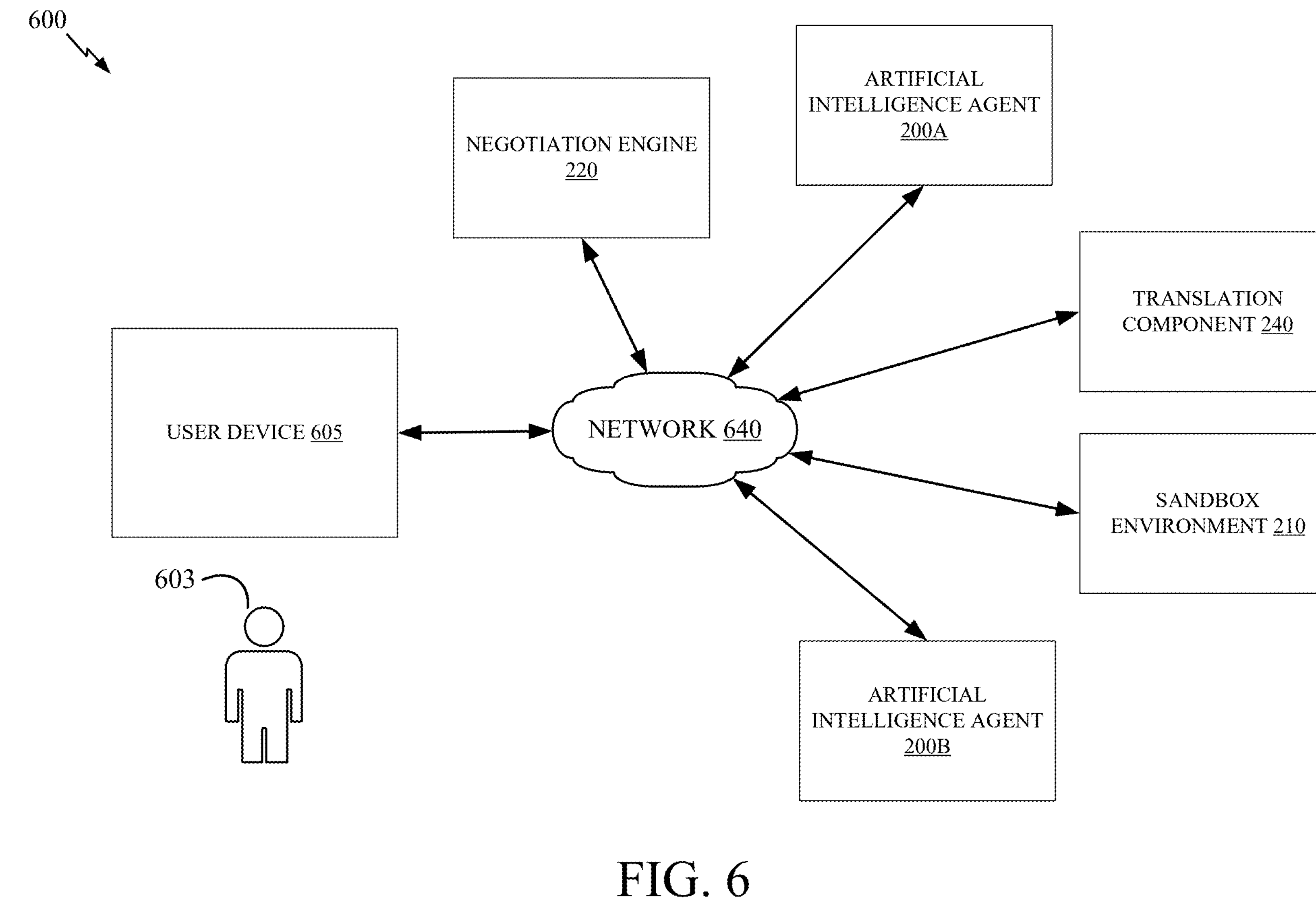
FIG. 6 depicts an additional example of computing components related to agent-to-agent communication.

FIG. 6 depicts an additional example of computing components related to agent-to-agent communication.

A user 603 may interact with an agentic artificial intelligence system 600 via a user interface of a user device 605 such as a mobile or desktop computer. The user 603 may interact with the agentic artificial intelligence system 600 to perform various tasks. For example, the user 603 may complete a form by interacting with the agentic artificial intelligence system 600, the user 603 may ask the agentic artificial intelligence system 600 questions and receive answers to the questions, the user 603 may receive content items from the agentic artificial intelligence system 600 based on instructions the user 603 provides to the agentic artificial intelligence system 600, and/or the like.

To complete the tasks for the user 603, the agentic artificial intelligence system 600 may use multiple AI agents, such as artificial intelligence agents 200A-B. Additional agents that are not shown may be used as well. As described above, a negotiation engine 220, sandbox environment 210, and translation component 240 may be used to restrict the agent-to-agent communications.

The user device 605, AI agents 200A-B, negotiation engine 220, translation component 240, and sandbox environment 210 may interact over a network 640. Network 640 may be any connection over which data may be transmitted. In one example, network 640 is the Internet.

Example Machine Learning Model

Figure 7:
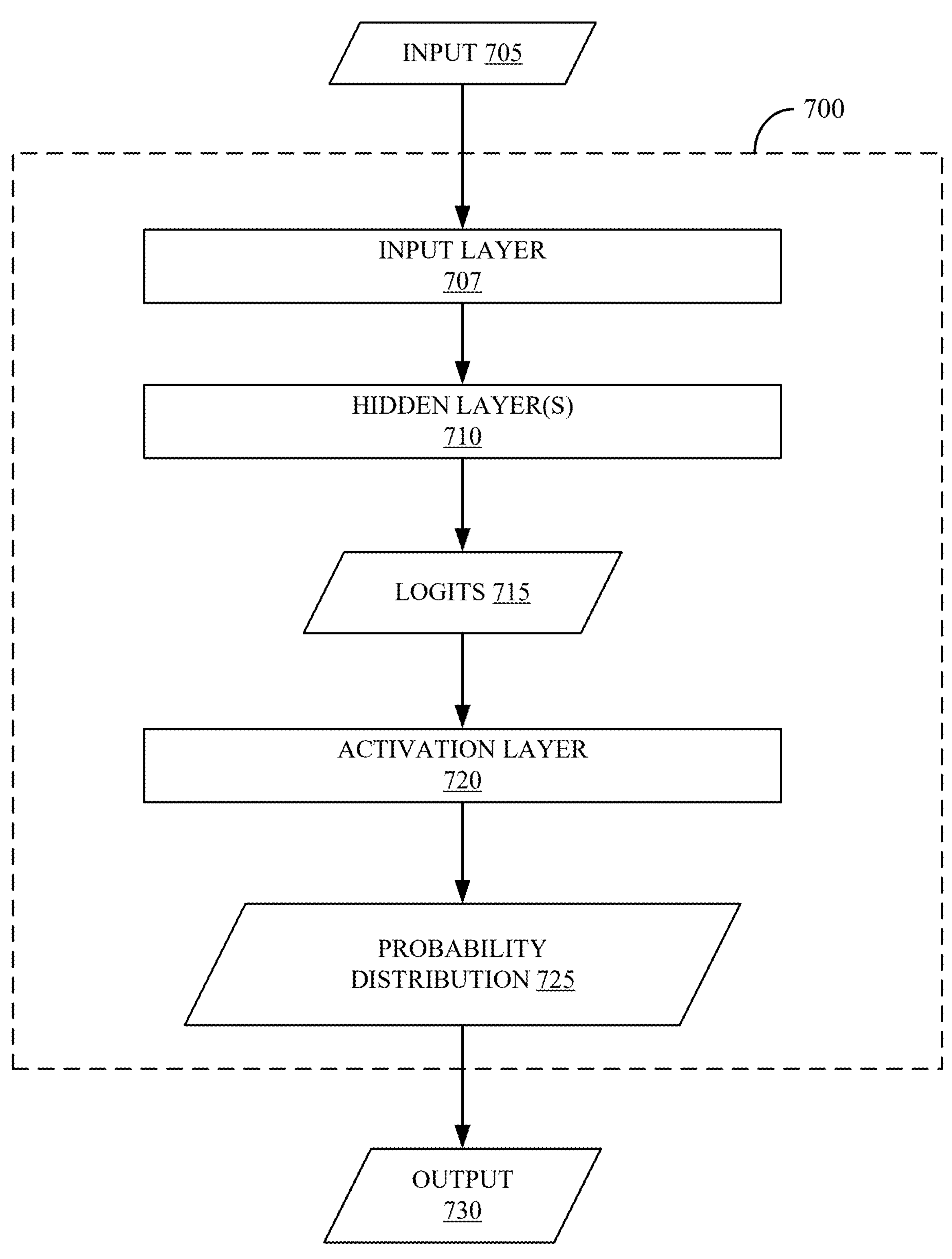
FIG. 7 depicts an example of a machine learning model according to certain embodiments disclosed herein.

FIG. 7 depicts an example machine learning model 700 according to embodiments disclosed herein. The machine learning model 700 may represent a machine learning model used by an AI agent, a machine learning model used by translation component 240, a machine learning model used by negotiation engine 220, an embedding model, and/or another machine learning model as described herein.

The machine learning model 700 represents a transformer model architecture having a plurality of layers. These layers may include input layer(s) 707, which process an input 705 provided to the model 700. The result of the processing performed by the input layer may be provided to hidden layers 710 of the machine learning model 700. The hidden layers 710 may include decoder layers. The hidden layers 710 may include one or more encoder layers, such as encoder layers found in a Bidirectional Encoder Representations from Transformer (BERT) model or a similar model used to generate embeddings. In some embodiments, a hidden state output generated by an encoder layer is used to generate a subsequent hidden state output via a decoder layer.

The hidden layers 710 may process an output generated by an input layer 707. The product of the processing performed by the hidden layers 710 (also referred to as hidden states of the machine learning model 700) may include output logits 715 that indicate raw, non-normalized scores or probabilities. The probabilities may correspond to probabilities of candidate tokens being the next word in an output 730 (e.g., if the model 700 is a generative model). For example, if the next word in a response is likely to be a particular word, the logit probabilities corresponding to the particular word may be relatively high compared to the logit probabilities corresponding to other words. The probabilities may correspond to classification (e.g., the classification probabilities may be used to map text of a prompt or response to a token of a schema).

The logits 715 may be provided to an activation layer 720. The activation layer 720 may use an activation function, such as a softmax function, to generate a probability distribution 725 based on the logits 715. The generated probability distribution 725 may be a probability distribution for different tokens. different scores, and/or the like. The probability distribution 725 may then be converted into tokens, a score, and/or the like and included in an output 730.

Architecture of the Example Machine Learning Model

The machine learning model 700 may be implemented using hardware and/or software. Each of the layers of the machine learning model 700 (e.g., input layer 707 and hidden layers 710) may comprise one or more neurons arranged in one or more neuron arrays. In an example embodiment, a neuron may comprise a register, a microprocessor, and at least one input. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. In some embodiments, the parameters of a model may include the synaptic weights of the model. Thus, a training process (e.g., a supervised learning process) for the model may involve adjusting the synaptic weights of the model until a condition is met. An example machine learning model may be a neural network having an input layer, an output layer, and a plurality of fully connected hidden layers (e.g., hidden layers 710). In some embodiments, a machine learning model may be implemented by an application-specific integrated circuit (ASIC). ASICs may be specially customized for a specific artificial intelligence application and provide superior computing capabilities and reduced electricity consumption compared to traditional CPUs.

A machine learning model (such as model 700 or another model described herein) may be trained based on supervised, unsupervised or semi-supervised learning techniques. Supervised learning techniques generally involve providing training inputs to a machine learning model. The machine learning model processes the training inputs and outputs predictions based on the training inputs. The predictions are compared to known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model, such as based on validation data and test data, as is known in the art.

Example Operations Related to Agent-to-Agent Communication

Figure 8:
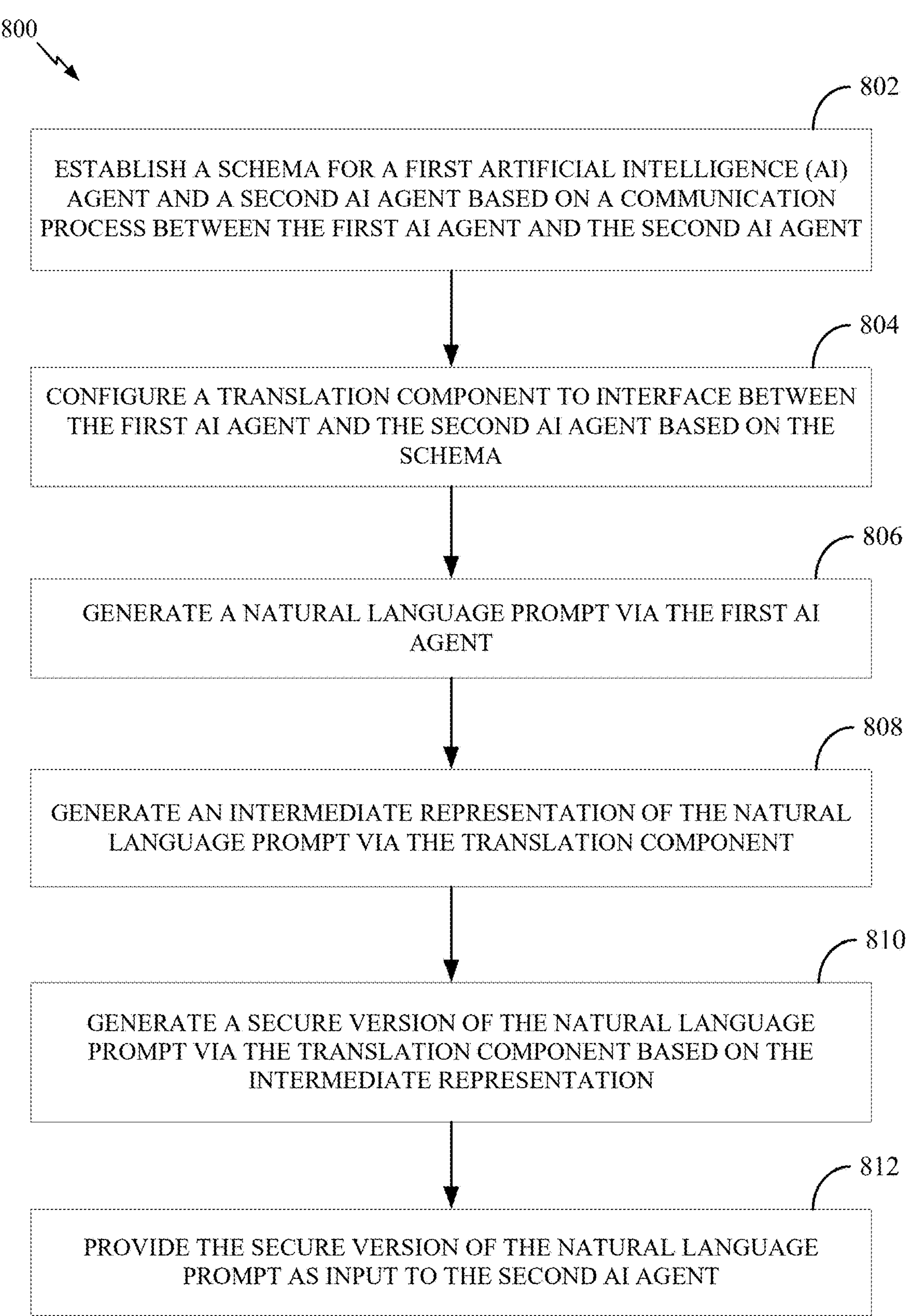
FIG. 8 depicts an additional example of operations related to agent-to-agent communication.

FIG. 8 depicts example operations 800 related to agent-to-agent communication. For example, operations 800 may be performed by one or more of the components described with respect to FIG. 2, FIG. 3, FIG. 4, FIG. 6, and FIG. 7.

Operations 800 begin at step 802 with establishing a schema for a first artificial intelligence (AI) agent and a second AI agent based on a communication process between the first AI agent and the second AI agent. According to some embodiments, the communication process involves determining actions performable by the second AI agent and the schema is established based on the determining.

Operations 800 continue at step 804 with configuring a translation component to interface between the first AI agent and the second AI agent based on the schema. Certain embodiments provide that the translation component comprises a first translation layer that generates the intermediate representation and a second translation layer that generates the secure version of the natural language prompt. Some embodiments provide that the second translation layer generates the secure version of the natural language prompt based on replacing a token of the intermediate representation with text that corresponds to the token.

Operations 800 continue at step 806 with generating a natural language prompt via the first AI agent.

Operations 800 continue at step 808 with generating an intermediate representation of the natural language prompt via the translation component. In some embodiments, the intermediate representation comprises a representation of the natural language prompt in terms of the schema.

Operations 800 continue at step 810 with generating a secure version of the natural language prompt via the translation component based on the intermediate representation.

Operations 800 continue at step 812 with providing the secure version of the natural language prompt as input to the second AI agent.

According to certain embodiments, operations 800 further comprise embedding a cryptographic watermark into the secure version of the natural language prompt at the translation component, wherein the secure version of the natural language prompt is provided to the second AI agent based on verifying the cryptographic watermark. In certain embodiments, operations 800 further comprise establishing an encrypted communication channel between the first AI agent and the second AI agent prior to the communication process. In some embodiments, operations 800 further comprise generating, via the second AI agent, a response to the secure version of the natural language prompt.

Figure 9:
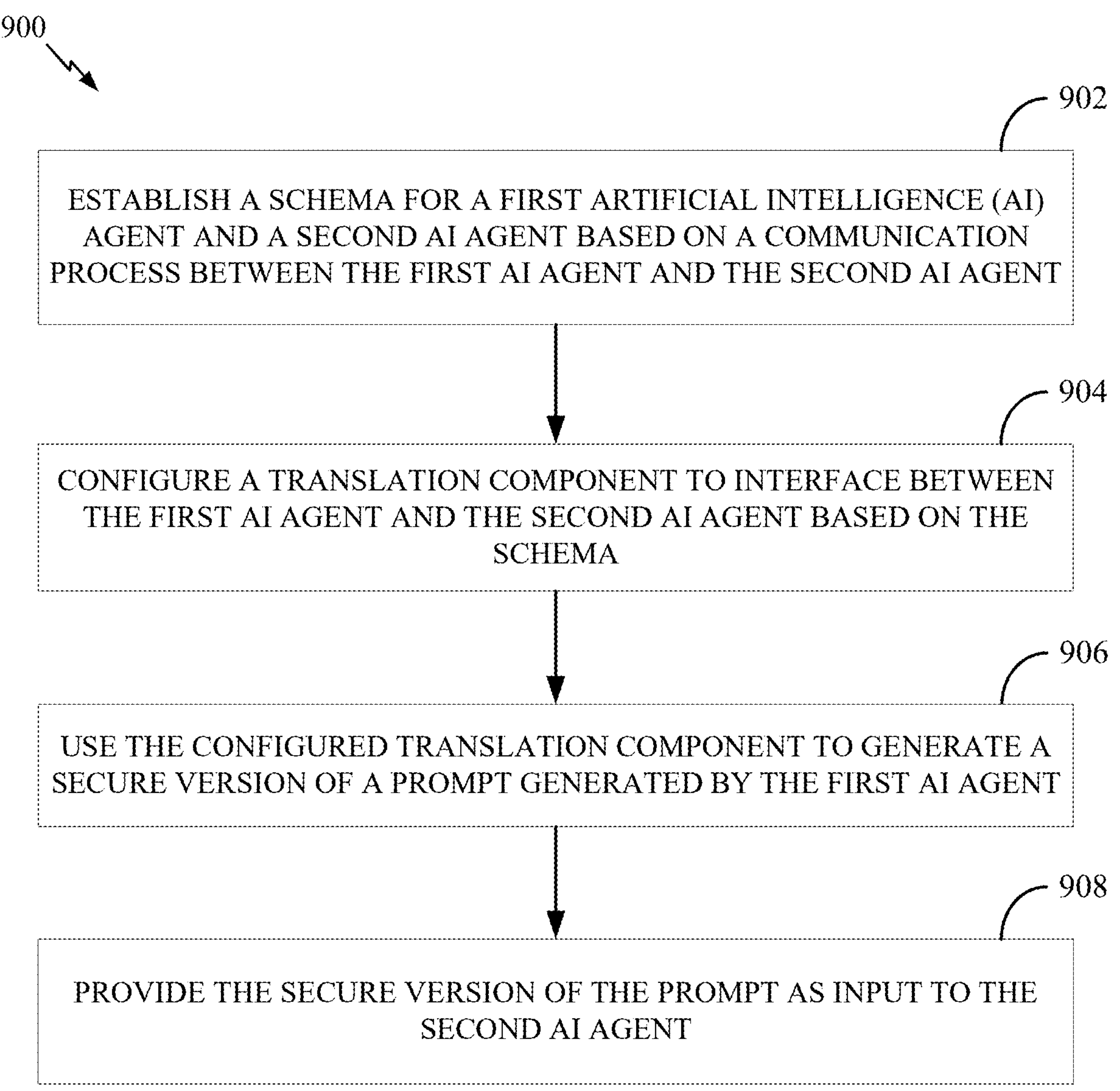
FIG. 9 depicts an additional example of operations related to agent-to-agent communication.

FIG. 9 depicts example operations 900 related to authenticating inputs to a generative machine learning model. For example, operations 900 may be performed by one or more of the components described with respect to FIG. 2, FIG. 3, FIG. 4, FIG. 6, and FIG. 7.

Operations 900 begin at step 902 with establishing a schema for a first artificial intelligence (AI) agent and a second AI agent based on a communication process between the first AI agent and the second AI agent.

Operations 900 continue at step 904 with configuring a translation component to interface between the first AI agent and the second AI agent based on the schema. Certain embodiments provide that wherein the configured translation component generates the secure version of the prompt based on filtering tokens from the prompt that are not defined in the schema. According to some embodiments, the configured translation component generates the secure version of the prompt based on translating the prompt into an intermediate representation comprising tokens defined in the schema.

Operations 900 continue at step 906 with using the configured translation component to generate a secure version of a prompt generated by the first AI agent.

Operations 900 continue at step 908 with providing the secure version of the prompt as input to the second AI agent.

According to certain embodiments, operations 900 further comprise embedding a cryptographic watermark into the secure version of the natural language prompt at the translation component, wherein the secure version of the natural language prompt is provided to the second AI agent based on verifying the cryptographic watermark. According to some embodiments, operations 900 further comprise establishing an encrypted communication channel between the first AI agent and the second AI agent prior to the communication process.

Example of a Processing System for Agent-to-Agent Communication

Figure 10:
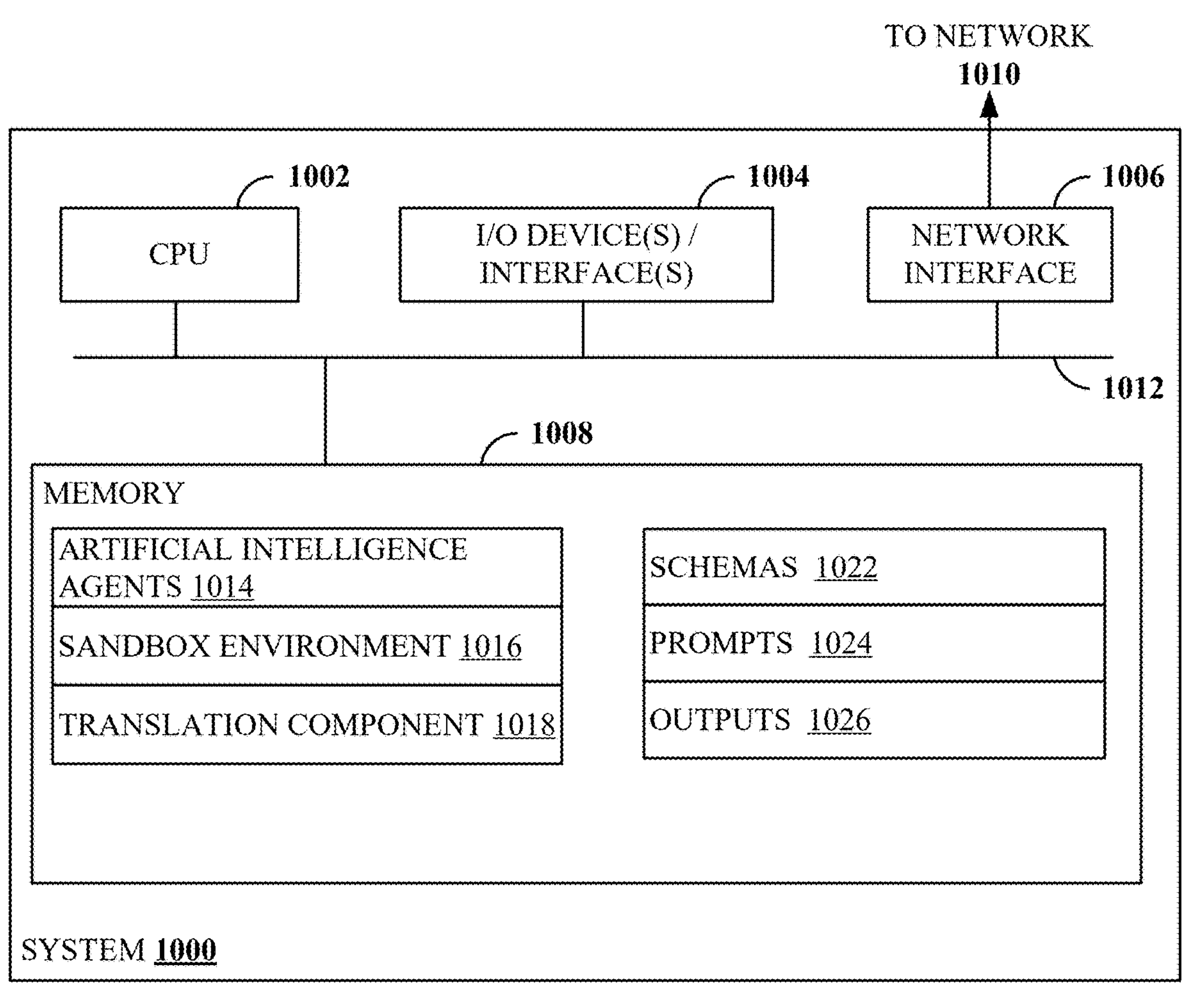
FIG. 10 depicts an example of a processing system for agent-to-agent communication.

FIG. 10 illustrates an example system 1000 with which embodiments of the present disclosure may be implemented. For example, system 1000 may be configured to perform operations 100 of FIG. 1, operations 800 of FIG. 8, and/or operations 900 of FIG. 9 and/or to implement one or more components as in FIG. 2, FIG. 3, FIG. 4, FIG. 6, and FIG. 7.

System 1000 includes a central processing unit (CPU) 1002, one or more I/O device interfaces that may allow for the connection of various I/O devices 1004 (e.g., keyboards, displays, mouse devices, pen input, etc.) to the system 1000, network interface 1006, a memory 1008, and an interconnect 1012. It is contemplated that one or more components of system 1000 may be located remotely and accessed via a network 1010. It is further contemplated that one or more components of system 1000 may comprise physical components or virtualized components.

CPU 1002 may retrieve and execute programming instructions stored in the memory 1008. Similarly, the CPU 1002 may retrieve and store application data residing in the memory 1008. The interconnect 1012 transmits programming instructions and application data, among the CPU 1002, I/O device interface 1004, network interface 1006, and memory 1008. CPU 1002 is included to be representative of a single CPU, multiple CPUs, a single CPU having multiple processing cores, and other arrangements.

Additionally, the memory 1008 is included to be representative of a random access memory or the like. In some embodiments, memory 1008 may comprise a disk drive, solid state drive, or a collection of storage devices distributed across multiple storage systems. Although shown as a single unit, the memory 1008 may be a combination of fixed and/or removable storage devices, such as fixed disc drives, removable memory cards or optical storage, network attached storage (NAS), or a storage area-network (SAN).

As shown, memory 1008 includes artificial intelligence agents 1014, sandbox environment 1016, and translation component 1018. Artificial intelligence agents 1014 may be representative of artificial intelligence agents 200A-B of FIG. 2, FIG. 3, FIG. 4, and/or FIG. 6. In some embodiments, sandbox environment 1016 may be representative of sandbox environment 210 of FIG. 2 and/or FIG. 6. In some embodiments, translation component 1018 may be representative of translation component 240 of FIG. 3, FIG. 4, and/or FIG. 6.

Memory 1008 further comprises schemas 1022, which may correspond to schema 230 of FIG. 2. Memory 1008 further comprises prompts 1024, which may correspond to prompt 305 of FIG. 3, prompt 405 of FIG. 4, prompt 500 of FIG. 5, secure prompt 335 of FIG. 3, secure prompt 435 of FIG. 4, intermediate prompt 425 of FIG. 4, and/or intermediate representation 510 of FIG. 5. Memory 1008 further comprises outputs 1026 which may correspond to outputs generated by an agent as described herein.

It is noted that in some embodiments, system 1000 may interact with one or more external components, such as via network 1010, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

establishing a schema for a first artificial intelligence (AI) agent and a second AI agent based on a communication process between the first AI agent and the second AI agent;

configuring a translation component to interface between the first AI agent and the second AI agent based on the schema;

generating a natural language prompt via the first AI agent;

generating an intermediate representation of the natural language prompt via the translation component;

generating a secure version of the natural language prompt via the translation component based on the intermediate representation; and providing the secure version of the natural language prompt as input to the second AI agent.

2. The method of claim 1, wherein the communication process involves determining actions performable by the second AI agent and the schema is established based on the determining.

3. The method of claim 1, wherein the intermediate representation comprises a representation of the natural language prompt in terms of the schema.

4. The method of claim 1, wherein the translation component comprises a first translation layer that generates the intermediate representation and a second translation layer that generates the secure version of the natural language prompt.

5. The method of claim 4, wherein the second translation layer generates the secure version of the natural language prompt based on replacing a token of the intermediate representation with text that corresponds to the token.

6. The method of claim 1, further comprising embedding a cryptographic watermark into the secure version of the natural language prompt at the translation component, wherein the secure version of the natural language prompt is provided to the second AI agent based on verifying the cryptographic watermark.

7. The method of claim 1, further comprising establishing an encrypted communication channel between the first AI agent and the second AI agent prior to the communication process.

8. The method of claim 1, further comprising generating, via the second AI agent, a response to the secure version of the natural language prompt.

9. A method, comprising:

establishing a schema for a first artificial intelligence (AI) agent and a second AI agent based on a communication process between the first AI agent and the second AI agent;

configuring a translation component to interface between the first AI agent and the second AI agent based on the schema;

using the configured translation component to generate a secure version of a prompt generated by the first AI agent; and providing the secure version of the prompt as input to the second AI agent.

10. The method of claim 9, wherein the configured translation component generates the secure version of the prompt based on filtering tokens from the prompt that are not defined in the schema.

11. The method of claim 9, wherein the configured translation component generates the secure version of the prompt based on translating the prompt into an intermediate representation comprising tokens defined in the schema.

12. The method of claim 9, further comprising embedding a cryptographic watermark into the secure version of the prompt at the translation component, wherein the secure version of the prompt is provided to the second AI agent based on verifying the cryptographic watermark.

13. The method of claim 9, further comprising establishing an encrypted communication channel between the first AI agent and the second AI agent prior to the communication process.

14. The method of claim 9, wherein the first AI agent and the second AI agent are trained to generate responses and outputs in terms of established schemas.

15. A system, comprising:

one or more processors; and a memory comprising instructions that, when executed by the one or more processors, cause the system to:

establish a schema for a first artificial intelligence (AI) agent and a second AI agent based on a communication process between the first AI agent and the second AI agent;

configure a translation component to interface between the first AI agent and the second AI agent based on the schema;

use the configured translation component to generate a secure version of a prompt generated by the first AI agent; and provide the secure version of the prompt as input to the second AI agent.

16. The system of claim 15, wherein the communication process involves determining actions performable by the second AI agent and the schema is established based on the determining.

17. The system of claim 15, wherein the configured translation component generates the secure version of the prompt based on filtering tokens from the prompt that are not defined in the schema.

18. The system of claim 15, wherein the first AI agent and the second AI agent are trained to generate responses and outputs in terms of established schemas.

19. The system of claim 15, wherein the instructions further cause the system to embed a cryptographic watermark into the secure version of the prompt at the translation component, wherein the secure version of the prompt is provided to the second AI agent based on verifying the cryptographic watermark.

20. The system of claim 15, wherein the instructions further cause the system to establish an encrypted communication channel between the first AI agent and the second AI agent prior to the communication process.

* * * * *